(12) United States Patent
Babaria et al.

(10) Patent No.: US 11,157,933 B2
(45) Date of Patent: Oct. 26, 2021

(54) SYSTEM AND METHOD FOR COMBINING COUPONS WITH FINANCIAL ACCOUNTS

(71) Applicant: Capital One Financial Corporation, McLean, VA (US)

(72) Inventors: Ketan Babaria, San Jose, CA (US); Bor J. Sun, San Francisco, CA (US); Janusz M. Niczyporuk, Vienna, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 535 days.

(21) Appl. No.: 14/462,846

(22) Filed: Aug. 19, 2014

(65) Prior Publication Data

US 2015/0051960 A1   Feb. 19, 2015

Related U.S. Application Data

(60) Provisional application No. 61/867,296, filed on Aug. 19, 2013.

(51) Int. Cl.
*G06Q 30/02* (2012.01)

(52) U.S. Cl.
CPC ..... *G06Q 30/0215* (2013.01); *G06Q 30/0225* (2013.01)

(58) Field of Classification Search
CPC ........................................ G06Q 30/0211–0215
See application file for complete search history.

(56) References Cited

U.S. PATENT DOCUMENTS

| 8,489,452 | B1* | 7/2013 | Warner | G06Q 30/0233 705/14.38 |
| 8,744,906 | B2* | 6/2014 | Fordyce, III | G06Q 30/0269 705/14.1 |
| 9,047,637 | B1* | 6/2015 | Blank | G06Q 20/4012 |
| 9,875,478 | B1* | 1/2018 | Tyler | G06Q 30/02 |
| 2007/0000996 | A1* | 1/2007 | Lambert | G06Q 20/387 235/380 |

(Continued)

OTHER PUBLICATIONS

"How Google Checkout Could Threaten PayPal", Article from MIT Technology Review, Wade Roush, 3 pages (Year: 2006).*

*Primary Examiner* — Abhishek Vyas
*Assistant Examiner* — Derek Jessen
(74) *Attorney, Agent, or Firm* — Troutman Pepper Hamilton Sanders LLP; Christopher J. Forstner; John A. Morrissett

(57) ABSTRACT

A system for linking coupons to financial accounts using a mobile device that includes a financial institution database that stores an account of an account holder, a communication interface of a financial institution that receives, via a network, coupon data associated with one or more discounts from a mobile device of the account holder, a linking processor that associates the coupon data with the account of the account holder, an authorization network interface that receives transaction data relating to transactions associated with the account of the account holder, a comparison processor of a financial institution that determines compares the coupon data with the transaction data to determine whether a qualifying transaction has occurred, and a discount processor of a financial institution that provides a credit to an account holder when a qualifying transaction has occurred.

28 Claims, 5 Drawing Sheets

(56) References Cited

U.S. PATENT DOCUMENTS

| | | | |
|---|---|---|---|
| 2010/0114686 A1* | 5/2010 | Carlson | G06Q 30/0222 705/14.17 |
| 2011/0125561 A1* | 5/2011 | Marcus | G06Q 30/0225 705/14.15 |
| 2011/0251880 A1* | 10/2011 | Butler | G06Q 30/0225 705/14.13 |
| 2011/0276378 A1* | 11/2011 | Pointer | G06Q 30/0215 705/14.17 |
| 2012/0010932 A1* | 1/2012 | Satyavolu | H04M 15/8011 705/14.17 |
| 2012/0128239 A1* | 5/2012 | Goswami | G06T 7/0002 382/162 |
| 2012/0197708 A1* | 8/2012 | Mullen | G06Q 30/0207 705/14.35 |
| 2014/0372193 A1* | 12/2014 | Jorgensen | G06Q 30/0269 705/14.23 |

* cited by examiner

100

SYSTEM AND METHOD FOR COMBINING COUPONS WITH FINANCIAL ACCOUNTS

CROSS-REFERENCE TO RELATED APPLICATIONS

This application contains subject matter related to and claims the benefit of U.S. Provisional Patent Application No. 61/867,296, filed on Aug. 19, 2013, the entire contents of which is incorporated herein by reference.

This application contains subject matter related to U.S. patent application Ser. No. 14/455,008, entitled "A System and Method for Providing Mobile Coupons for Redemption," filed on Aug. 8, 2014, which claims priority to U.S. Provisional Application No. 61/863,495 filed on Aug. 8, 2013, both of which are incorporated herein by reference in their entirety.

FIELD OF THE DISCLOSURE

The present disclosure relates to systems and methods for using mobile devices and application to enable coupons to be linked to financial accounts.

BACKGROUND OF THE DISCLOSURE

Currently, a merchant that offers deals to customers must either offer the same deal to everyone (for example, Gap offers 15% off for in-store purchases) or ask consumers to clip paper coupons and bring them to the store when they make a purchase. Many merchants offer discounts online, but a customer that wants to redeem the online discounts at a physical location must print the coupons and bring them to the physical store. This method is inconvenient and inefficient for both consumers and merchants.

These and other drawbacks exist.

SUMMARY OF THE DISCLOSURE

Various exemplary embodiments enable use of a mobile device to link coupons to financial accounts. In various embodiments, a system includes a financial institution database that stores an account of an account holder, a communication interface of a financial institution that receives, via a network, coupon data associated with one or more discounts from a mobile device of the account holder, a linking processor that associates the coupon data with the account of the account holder, an authorization network interface that receives transaction data relating to transactions associated with the account of the account holder, a comparison processor of a financial institution that determines compares the coupon data with the transaction data to determine whether a qualifying transaction has occurred, and a discount processor of a financial institution that provides a credit to an account holder when a qualifying transaction has occurred.

In an example embodiment, the coupon data includes a threshold value and the comparison processor determines whether a qualifying transaction has occurred based on the threshold value. In such an embodiment, the threshold value is a minimum purchase amount, the transaction data includes a transaction amount for one of the transactions, and the comparison processor determines that a qualifying transaction has occurred when the transaction amount is greater than or equal to the minimum purchase amount.

In an example embodiment, the coupon data includes a coupon merchant, the transaction data includes a transaction merchant for one of the transactions, and the comparison processor determines that a qualifying transaction has occurred when the coupon merchant and the transaction merchant are the same.

Also, the mobile device captures the coupon data by scanning a bar code on a paper coupon.

The system also may include a statement processor that generate an account statement that includes the credit.

In various embodiments, the coupon data includes information derived from optical character recognition on the mobile device. The coupon data also includes an image of a coupon captured by a mobile device, and wherein the system further comprises an optical character recognition module that recognizes coupon data from the image of the coupon.

In various embodiments, a system includes an input mechanism of a mobile device that receives coupon data associated with one or more discounts, a mobile application module of the mobile device that cooperates with the input mechanism to receive the coupon data, and a communication interface of the mobile device that transmits, via a network, the coupon data associated with one or more discounts from a mobile device of the account holder to a financial institution system. In such embodiments, the financial institution system includes a financial institution database that stores an account of an account holder, a communication interface of a financial institution that receives, via a network, coupon data associated with one or more discounts from a mobile device of the account holder, a linking processor that associates the coupon data with the account of the account holder, an authorization network interface that receives transaction data relating to transactions associated with the account of the account holder, a comparison processor of a financial institution that determines compares the coupon data with the transaction data to determine whether a qualifying transaction has occurred; a discount processor of a financial institution that provides a credit to an account holder when a qualifying transaction has occurred.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific exemplary embodiments and details involving systems and methods for linking coupon offers with an account holder's financial account. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only.

Figure 1:
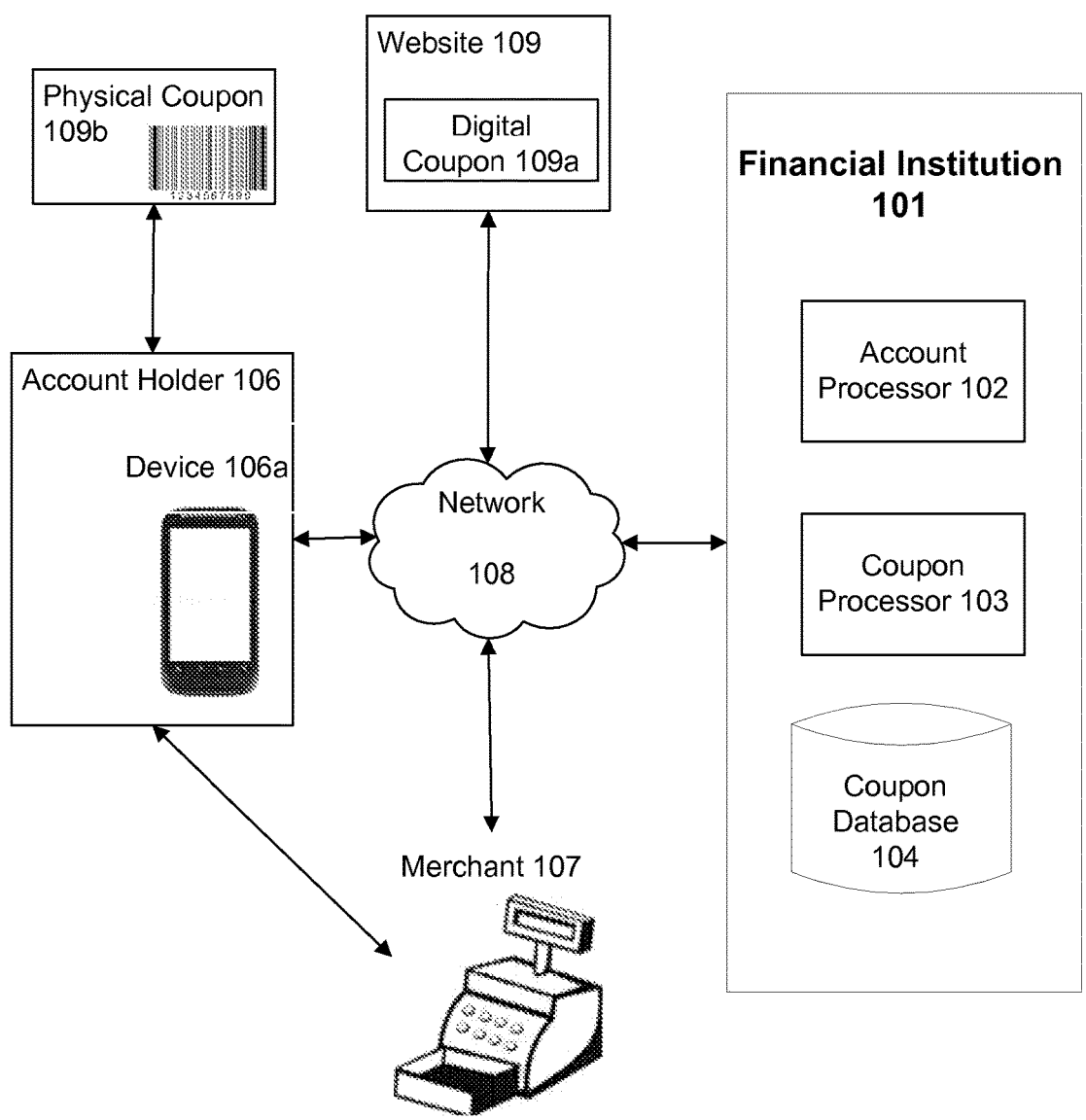
FIG. 1 depicts a schematic diagram of a system for linking coupons with a financial account, according to an exemplary embodiment of the disclosure.

FIG. 1 depicts an exemplary embodiment of a system 100 for linking coupon offers with an account holder's account, according to various embodiments of the disclosure. In various embodiments, the components of system 100 may include application programming interfaces (APIs) to enable a mobile device to link a offer to a financial account so that a statement credit may automatically be processed when the offer is linked to the account. For example, system 100 may include APIs to enable a button associated with an offer to appear within a mobile application associated with a financial institution and/or financial account and enable a user to link the offer to the financial account. System 100 also may include APIs to enable a user to scan a QR code using a mobile device to link the offer to the financial account. When the user completes a transaction that is associated with or consistent with the terms of the offer, a financial institution may automatically issue a statement to the financial account.

Figure 2:
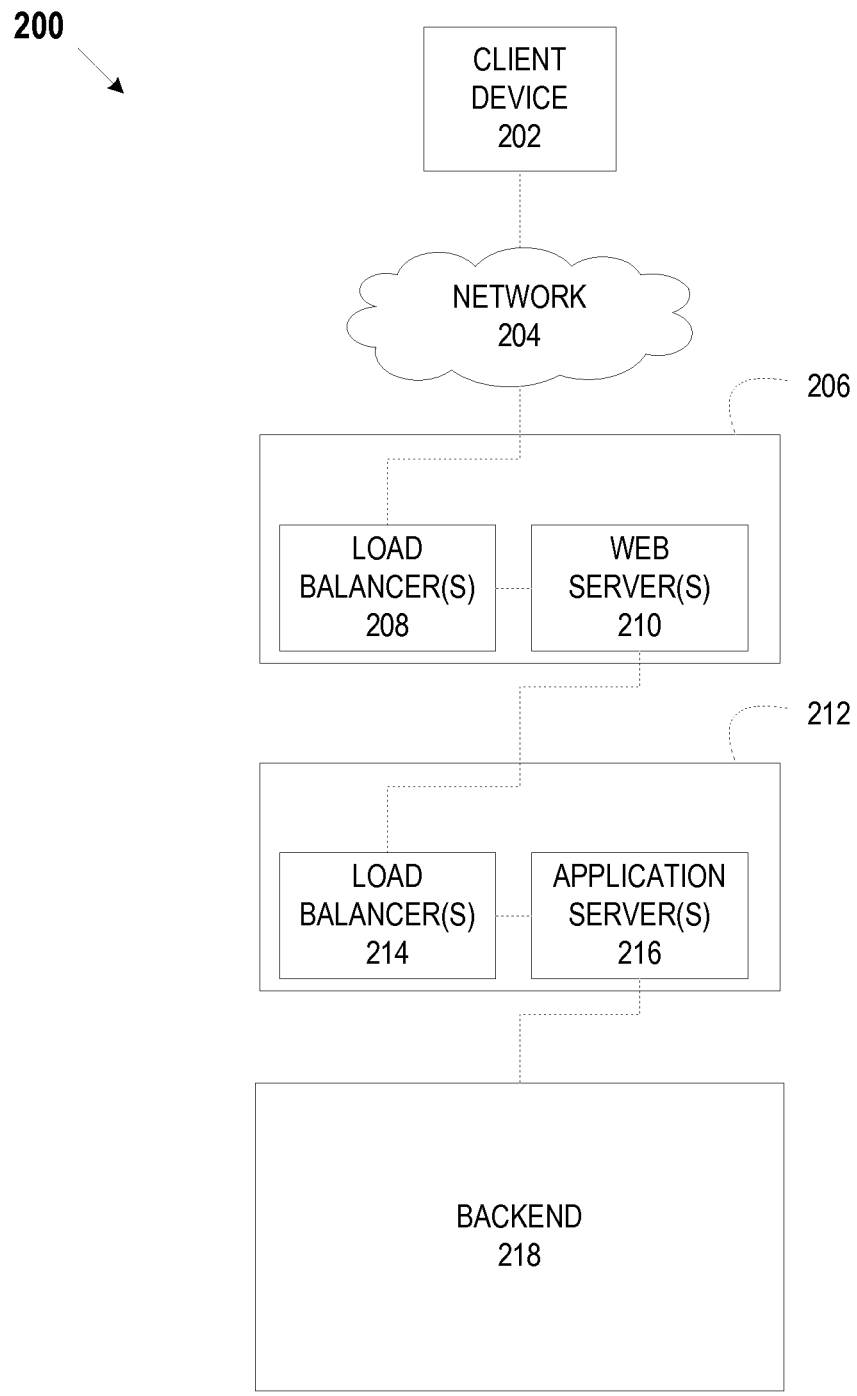
FIG. 2 depicts a schematic diagram of a system for allowing an account holder to redeem coupons with a financial institution, according to an example embodiment of the disclosure.

The system may include various network-enabled computer systems, including, as depicted in FIG. 1 for example, a financial institution 101; comprising one or more network-enabled computers, including an account processor 102, a coupon processor 103, and a coupon database 104, which may be included as separate processors or combined into device having a single processor or device having the multiple processors. It is also noted that the system 100 illustrates only a single instance of each component. It will be appreciated that multiple instances of these components may be used. Moreover, the system 100 may include other devices not depicted in FIG. 1. For example, FIG. 2 depicts an example system 200 that may enable a financial institution, for example, to provide network services to its customers. As shown in FIG. 2, system 200 may include a client device 202, a network 204, a front-end controlled domain 206, a back-end controlled domain 212, and a backend 218. Front-end controlled domain 206 may include one or more load balancers 208 and one or more web servers 210. Back-end controlled domain 212 may include one or more load balancers 214 and one or more application servers 216.

Client device 202 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

Client device 202 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 204 may be one or more of a wireless network, a wired network, or any combination of a wireless network and a wired network. For example, network 204 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 204 may include, without limitation, telephone lines, fiber optics, IEEE Ethernet 902.3, a wide area network (WAN), a local area network (LAN) or a global network such as the Internet. Also, network 204 may support an Internet network, a wireless communication network, a cellular network, or the like, or any combination thereof. Network 204 may further include one network, or any number of example types of networks mentioned above, operating as a stand-alone network or in cooperation with each other. Network 204 may utilize one or more protocols of one or more network elements to which they are communicatively couples. Network 204 may translate to or from other protocols to one or more protocols of network devices. Although network 204 is depicted as a single network, it should be appreciated that according to one or more embodiments, network 204 may comprise a plurality of interconnected networks, such as, for example, the Internet, a service provider's network, a cable television network, corporate networks, and home networks.

Front-end controlled domain 206 may be implemented to to provide security for backend 218. Load balancer(s) 208 may distribute workloads across multiple computing resources, such as, for example computers, a computer cluster, network links, central processing units or disk drives. In various embodiments, load balancer(s) 210 may distribute workloads across, for example, web server(S) 216 and/or backend 218 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 208 may include software that monitoring the port where external clients, such as, for example, client device 202, connect to access various services of a financial institution, for example. Load balancer(s) 208 may forward requests to one of the application servers 216 and/or backend 218 servers, which may then reply to load balancer 208. This may allow load balancer(s) 208 to reply to client device 202 without client device 202 ever knowing about the internal separation of functions. It also may prevent client devices from contacting backend servers directly, which may have security benefits by hiding the structure of the internal network and preventing attacks on backend 218 or unrelated services running on other ports, for example.

A variety of scheduling algorithms may be used by load balancer(s) 208 to determine which backend server to send a request to. Simple algorithms may include, for example, random choice or round robin. Load balancers 208 also may account for additional factors, such as a server's reported load, recent response times, up/down status (determined by a monitoring poll of some kind), number of active connections, geographic location, capabilities, or how much traffic it has recently been assigned.

Load balancers 208 may be implemented in hardware and/or software. Load balancer(s) 208 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 210 may include hardware (e.g., one or more computers) and/or software (e.g., one or more applications) that deliver web content that can be accessed by, for example a client device (e.g., client device 202) through a network (e.g., network 204), such as the Internet. In various examples, web servers, may deliver web pages, relating to, for example, online banking applications and the like, to clients (e.g., client device 202). Web server(s) 210 may use, for example, a hypertext transfer protocol (HTTP or sHTTP) to communicate with client device 202. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 210 may respond with the content of that resource or an error message if unable to do so. The resource may be, for example a file on stored on backend 218. Web server(s) 210 also may enable or facilitate receiving content from client device 202 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 210 can be scripted in separate files, while the actual server software remains unchanged.

Load balancers 214 may be similar to load balancers 208 as described above.

Application server(s) 216 may include hardware and/or software that is dedicated to the efficient execution of procedures (e.g., programs, routines, scripts) for supporting its applied applications. Application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 216 may act as a set of components accessible to, for example, a financial institution or other entity implementing system 200, through an API defined by the platform itself. For Web applications, these components may be performed in, for example, the same running environment as web server(s) 210, and application servers 216 may support the construction of dynamic pages. Application server(s) 216 also may implement services, such as, for example, clustering, fail-over, and load-balancing. In various embodiments, where application server(s) 216 are Java application servers, the web server(s) 216 may behaves like an extended virtual machine for running applications, transparently handling connections to databases associated with backend 218 on one side, and, connections to the Web client (e.g., client device 202) on the other.

Backend 218 may include hardware and/or software that enables the backend services of, for example, a financial institution or other entity that maintains a distributes system similar to system 200. For example, backend 218 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, a couponing platform that enables coupon redemption by a financial institution and the like. Backend 218 may be associated with various databases, including account databases that maintain, for example, customer account information, product databases that maintain information about products and services available to customers, content databases that store content associated with, for example, a financial institution, and the like. Backend 218 also may be associated with one or more servers that enable the various services provided by system 200.

Referring back to FIG. 1, in various examples, the coupon processor 103, coupon database 104, and/or the account processor 102 may be separate from financial institution 101. Coupon processor 103, coupon database 104, and/or account processor 102 also may be integrated into, for example, merchant 107. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of account services for account holder 106's computing devices, such as device 106*a*.

The components depicted in FIG. 1 may store information in various electronic storage media, such as, for example, coupon database 104. Electronic information, files, and documents may be stored in various ways, including, for example, a flat file, indexed file, hierarchical database, relational database, such as a coupon database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the exemplary types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

In various exemplary embodiments, an account holder 106 may be any individual or entity that desires to conduct a financial transaction using one or more accounts held at one or more financial institutions. Also, an account holder may be a computer system associated with or operated by such an individual or entity. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. A financial institution may be, for example, a bank, other type of financial institution, including a credit card provider, for example, or any other entity that offers accounts to customers. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

Account holder 106 may access an account with financial institution 101 using one or more software applications on various network-enabled devices, such as device 106a. The software applications may provide one or more account services. The software applications may enable the account holder 106 to remotely access his accounts with financial institution 101 over network 108. The account holder 106 in this disclosure need not have an account with a financial institution. The software application may be provided by financial institution 101, or merchant 107, or a third party. An account holder may have one or more shoppers accounts with merchants. The software applications described may be available to any user or individual with a network-enabled device, regardless of whether this individual has a financial account.

Device 106a may be a PC or laptop. Device 106a may be a mobile device. As used herein, a mobile device may be, for example, a handheld PC, a phone, a smartphone, a PDA, a tablet computer, or other device. Device 106a may include Near Field Communication (NFC) capabilities, which may allow for communication with other devices by touching them together or bringing them into close proximity. Exemplary NFC standards include ISO/IEC 18092:2004, which defines communication modes for Near Field Communication Interface and Protocol (NFCIP-1). For example, device 106a may be configured using the Isis Mobile Wallet™ system, which is incorporated herein by reference. Other exemplary NFC standards include those created by the NFC Forum.

As described with reference to FIG. 1, financial institution 101 may provide an account holder with one or more financial accounts. The financial account may be associated with the account holder's one or more devices, such as device 106a. Device 106a may be a mobile device configured to act as a method of payment at a POS location (merchant 107) using, for example, NFC or any other mobile payment technology.

Figure 3:
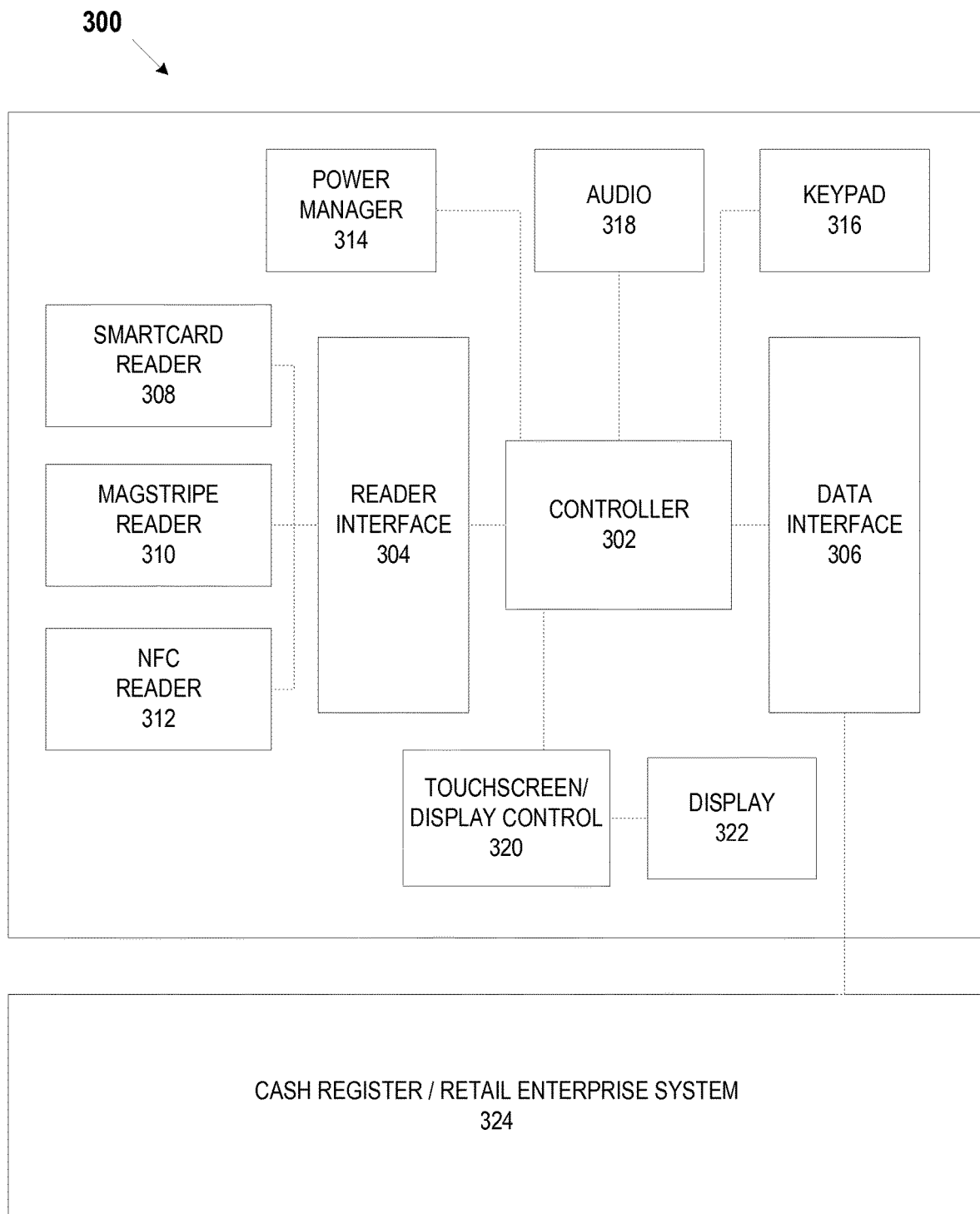
FIG. 3 depicts a schematic diagram of a system for allowing an account holder to redeem coupons with a financial institution, according to an example embodiment of the disclosure.

FIG. 3 depicts an example Point of Sale (PoS) device 300. PoS device 300 may provide the interface at what a customer or end user makes a payment to the merchant in exchange for goods or services. PoS device 300 may include and/or cooperate with weighing scales, scanners, electronic and manual cash registers, electronic funds transfer at point of sale (EFTPOS) terminals, touch screens and any other wide variety of hardware and software available for use with PoS device 300. PoS device 300 may be a retail point of sale system and may include a cash register and/or cash register-like computer components to enable purchase transactions. PoS device 300 also may be a hospitality point of sale system and include computerized systems incorporating registers, computers and peripheral equipment, usually on a computer network to be used in restaurant, hair salons, hotels or the like. PoS device 300 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 300 also may be a cloud-based point of sale system that can be deployed as software as a service, which can be accessed directly from the Internet using, for example, an Internet browser.

Referring to FIG. 3, an example PoS device 300 is shown. PoS device 300 may include a controller 302, a reader interface 304, a data interface 306, a smartcard reader 308, a magnetic stripe reader 310, a near-field communications (NFC) reader 312, a power manager 314, a keypad 316, an audio interface 318, a touchscreen/display controller 320, and a display 322. Also, PoS device 300 may be coupled with, integrated into or otherwise connected with a cash register/retail enterprise system 324.

In various embodiments, Controller 302 may be any controller or processor capable of controlling the operations of PoS device 300. For example, controller 302 may be a Intel® 2nd Generation Core™ i3 or i5 or Pentium™ G850 processor or the like. Controller 302 also may be a controller included in a personal computer, smartphone device, tablet PC or the like.

Reader interface 304 may provide an interface between the various reader devices associated with PoS device 300 and PoS device 300. For example, reader interface 304 may provide an interface between smartcard reader 308, magnetic stripe reader 310, NFC reader 312 and controller 302. In various embodiments, reader interface 304 may be a wired interface such as a USB, RS232 or RS485 interface and the like. Reader interface 304 also may be a wireless interface and implement technologies such as Bluetooth, the 802.11(x) wireless specifications and the like. Reader interface 304 may enable communication of information read by the various reader devices from the various reader devices to PoS device 300 to enable transactions. For example, reader interface 304 may enable communication of a credit or debit card number read by a reader device from that device to PoS device 300. In various embodiments, reader interface 304 may interface between PoS device 300 and other devices that do not necessarily "read" information but instead receive information from other devices.

Data interface 306 may allow PoS device 300 to pass communicate data throughout PoS device and with other devices including, for example, cash register/retail enterprise system 324. Data interface 306 may enable PoS device 300 to integrate with various customer resource management (CRM) and/or enterprise resource management (ERP) systems. Data interface 306 may include hardware, firmware and software that make aspects of data interface 306 a wired interface. Data interface 306 also may include hardware, firmware and software that make aspects of data interface 306 a wireless interface. In various embodiments, data interface 306 also enables communication between PoS device other devices.

Smartcard reader 308 may be any electronic data input device that reads data from a smart card. Smartcard reader 308 may be capable of supplying an integrated circuit on the smart card with electricity and communicating with the smart card via protocols, thereby enabling read and write functions. In various embodiments, smartcard reader 308 may enable reading from contact or contactless smart cards. Smartcard reader 308 also may communicate using standard protocols including ISO/IEC 7816, ISO/IEC 14443 and/or the like or proprietary protocols.

Magnetic stripe reader 310 may be any electronic data input device that reads data from a magnetic stripe on a credit or debit card, for example. In various embodiments, magnetic stripe reader 310 may include a magnetic reading head capable of reading information from a magnetic stripe. Magnetic stripe reader 310 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 312 may be any electronic data input device that reads data from a NFC device. In an exemplary embodiment, NFC reader 312 may enable Industry Standard NFC Payment Transmission. For example, the NFC reader 312 may communicate with a NFC enabled device to enable two loop antennas to form an air-core transformer when placed near one another by using magnetic induction. NFC reader 312 may operate at 13.56 MHz or any other acceptable frequency. Also, NFC reader 312 may enable a passive communication mode, where an initiator device provides a carrier field, permitting answers by the target device via modulation of existing fields. Additionally, NFC reader 312 also may enable an active communication mode by allowing alternate field generation by the initiator and target devices.

In various embodiments, NFC reader 312 may deactivate an RF field while awaiting data. NFC reader 312 may receive communications containing Miller-type coding with varying modulations, including 100% modulation. NFC reader 312 also may receive communications containing Manchester coding with varying modulations, including a modulation ratio of approximately 10%, for example. Additionally, NFC reader 312 may be capable of receiving and transmitting data at the same time, as well as checking for potential collisions when the transmitted signal and received signal frequencies differ.

NFC reader 312 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 312 may be able to utilize transmission protocols and methods that are developed in the future using other frequencies or modes of transmission. NFC reader 312 also may be backwards-compatible with existing payment techniques, such as, for example RFID. Also, NFC reader 312 may support transmission requirements to meet new and evolving payment standards including internet based transmission triggered by NFC. In various embodiments, NFC reader 312 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 314 may be any microcontroller or integrated circuit that governs power functions of PoS device 300. Power manager 314 may include, for example, firmware, software, memory, a CPU, a CPU, input/output functions, timers to measure intervals of time, as well as analog to digital converters to measure the voltages of the main battery or power source of PoS device 300. In various embodiments, Power manager 314 remain active even when PoS device 300 is completely shut down, unused, and/or powered by the backup battery. Power manager 314 may be responsible for coordinating many functions, including, for example, monitoring power connections and battery charges, charging batteries when necessary, controlling power to other integrated circuits within PoS device 300 and/or other peripherals and/or readers, shutting down unnecessary system components when they are left idle, controlling sleep and power functions (on and off), managing the interface for built-in keypad and trackpads, and/or regulating a real-time clock (RTC).

Keypad 316 may any input device that includes a set of buttons arranged, for example, in a block or pad and may bear digits, symbols and/or alphabetical letters. Keypad 316 may be a hardware-based or mechanical-type keypad and/or implemented in software and displayed on, for example, a screen or touch screen to form a keypad. Keypad 316 may receive input from a user that pushed or otherwise activates one or more buttons on keypad 316 to provide input.

Audio interface 318 may be any device capable of providing audio signals from PoS device 300. For example, audio interface may be a speaker or speakers that may produce audio signals. In various embodiments, audio interface 318 may be integrated within PoS device 300. Audio interface 318 also may include components that are external to PoS device 300.

Touchscreen/display control 320 may be any device or controller that contrals an electronic visual display. Touchscreen/display control 320 may allow a user to interact with PoS device 300 through simple or multi-touch gestures by touching a screen or display (e.g., display 322). Touchscreen/display control 320 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 320 may receive inputs from the touchscreen and process the received inputs. Touchscreen/display control 320 also may control the display on PoS device 300, thereby providing the graphical user interface on a display to a user of PoS device 300.

Display 322 may be any display suitable for a PoS device. For example, display 322 may be a TFT, LCD, LED or other display. Display 322 also may be a touchscreen display that for example allows a user to interact with PoS device 300 through simple or multi-touch gestures by touching a screen or display (e.g., display 322). Display 322 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 322 may receive inputs from control gestures provided by a user. Display 322 also may display images, thereby providing the graphical user interface to a user of PoS device 300.

Cash register/retail enterprise system 324 may me any device or devices that cooperate with PoS device 300 to process transactions. Cash register/retail enterprise system 324 may be coupled with other components of PoS device 300 via, for example, a data interface (e.g., data interface 306) as illustrated in FIG. 3. Cash register/retail enterprise system 324 also may be integrated into PoS device 300.

In various embodiments, cash register/retail enterprise system 324 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 324 may comprise an retail enterprise system and/or a customer relationship management system. Retail enterprise system 324 may enable retain enterprises to manage operations and performance across a retail operation. Retail enterprise system 324 may be a stand-alone application in, for example, individual stores, or may be interconnected via a network. Retail enterprise system 324 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date, issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 324 also may include inventory control and tracking capabilities, reporting tools, customer management capabilities, employee management tools, and may integrate with other accounting software.

In various embodiments cash register/retail enterprise system 324 may be a hospitality PoS. In such embodiments, retail enterprise system 324 may include hospitality PoS software (e.g, Aloha PoS Restaurant software from NCR®, Micros® RES and Symphony software and the like), hospitality management software, and other hardware and software to facilitate hospitality operations.

Referring back to FIG. 1, when an account holder uses device 106a at a POS location to perform a financial transaction, the financial transaction may be charged to the mobile payment account. For example, the account holder may use mobile device 106a in lieu of a credit card to make a purchase merchant 107. The purchase would then be charged to the mobile payment account associated with the mobile device 106a. The mobile payment account may be stored in a mobile payment account database associated with account processor 102 at financial institution 101. The account may be a traditional credit card account where the account holder uses a credit card, rewards card, debit card, or similar method of payment to purchase goods and services from one or more merchants 107.

Figure 4:
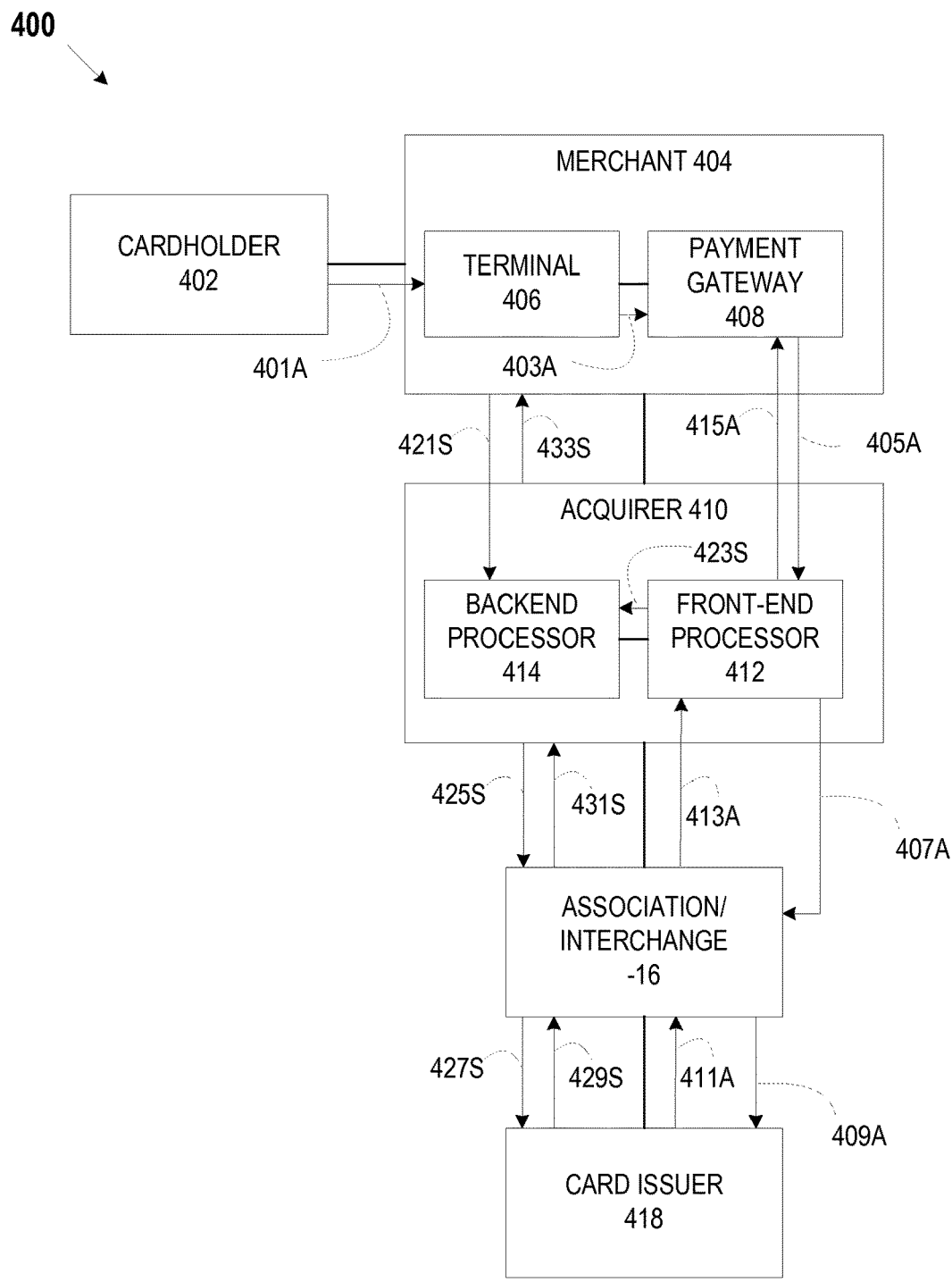
FIG. 4 depicts a schematic diagram of a system for allowing an account holder to redeem coupons with a financial institution, according to an example embodiment of the disclosure.

FIG. 4 illustrates an example system 400 and method for card authorization. As shown and described in FIG. 4, merchants, cardholders and financial institutions may be connected with a card association network to enable secure transactions and timely payments. System 400 may include a cardholder 402, merchant 404, Acquirer 410, Association/Interchange 416, and card issuer 418.

Cardholder 402 may be any card holder, including a credit card holder, debit card holder, stored value card holder and the like. Cardholder 402 may possess a plastic card or carry a device (e.g., a mobile device) that securely stores card credentials and is capable of transmitting the card credentials to, for example, a PoS terminal (e.g., terminal 406). Cardholder 402 may interact with a merchant (e.g., merchant 404) by presenting a card or card credentials to a terminal (e.g., terminal 406).

Merchant 404 may be any merchant that accepts payment from a cardholder, for example. Merchant 404 may be any retailer, service provider, business entity, or individual that accepts payments. Merchant 404 may include software, firmware and hardware for accepting and/or processing payments. For example, as illustrated in FIG. 4, merchant 404 may include a terminal 406 and a payment gateway 408. Terminal 406 and payment gateway 408 may comprise the physical or virtual device(s) used by merchant 404 to communicate information to front-end processor 412 of acquirer 410. Terminal 406 may be similar to PoS system [Y00] as shown and described in Figure Y. In various embodiments, payment gateway 408 may be an e-commerce application service provider service that authorizes payments for merchants. As such, payment gateway 408 may be a virtual equivalent of a PoS terminal and interface with, for example, a billing system of merchant 404 and pass data to front-end processor 412 of acquirer 410.

Acquirer 410 may be, for example, a financial institution or bank, that holds the contract for providing payment processing services to merchant 404. Merchant 404 may have a merchant account that may serve as a contract under which Acquirer 410 may extend a line of credit to a merchant who wishes to accept, for example, credit card transactions. As shown in FIG. 4, Acquirer 410 may be associated with front-end processor 412 and back-end processor 414.

In various examples, front-end processor 412 may be a platform that card terminal 406 and/or payment gateway 408 communicate with when approving a transaction. Front-end processor 412 may include hardware, firmware, and software to process transactions. Front-end processor 412 may be responsible for the authorization and capture portion of credit card transaction. Front-end processor 412 also may include additional front-end platform interconnections to support, for example, ACH and debit transactions.

Backend processor 414 may be a platform that takes captured transactions from front-end processor 412 and settles them through an Interchange system (e.g., association/interchange 416). Back-end processor 414 may generate, for example, daily ACH files for merchant settlement. Back-end processor 414 also may handle chargeback handling, retrieval request and monthly statements.

Association/interchange 416 may be the consumer payment system whose members are the financial institutions that issue payment cards and/or sign merchant to accept payment cards. Example associations/interchanges 416 may include, Visa®, MasterCard®, and AmericanExpress®. Association/interchange 416 may include one or more computer systems and networks to process transactions.

Issuer 418 may be a financial institution that issues payment cards and maintains a contract with cardholders for repayment. In various embodiments, issuer 418 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 402 may present payment card as payment (401A) at merchant 404 PoS terminal 406, for example. Merchant 404 may enter card into a physical PoS terminal 406 or submit a credit card transaction to a payment gateway 408 on behalf of cardholder 402 via secure connection from a Web site, retail location, or a wireless device.

Payment gateway 408 may receive the secure transaction information (403A) and may pass the secure transaction information (405A) via a secure connection to the merchant acquirer's 410 front-end processor 412.

Front-end processor 412 may submit the transaction (407A) to association/interchange 416 (e.g., a network of financial entities that communicate to manage the processing, clearing and settlement of credit card transactions). Association/interchange 416 may route the transaction (409A) to the customer's Issuer 418. Issuer 418 may approve or decline the transaction and passes the transaction results back (411A) through association/interchange 416. Association/interchange then may relay the transaction results (413A) to front-end processor 412.

Front-end processor 412 may relay the transaction results (415A) back to the payment gateway 408 and/or terminal 406. Payment gateway 408 may store the transaction results and sends them to merchant 404. Merchant 404 may receive the authorization response and complete the transaction accordingly.

During settlement, merchant 404 may deposit the transaction receipt (421S) with acquirer 410 via, for example, a settlement batch. Captured authorizations may be passed (423S) from front-end processor 412 to the back-end processor 414 for settlement. Back-end processor may generates ACH files for merchant settlement. Acquirer may submit settlement files (425S, 427S) to Issuer 418 for reimbursement via association/interchange 416. Issuer 418 may post the transaction and pay merchant 404 (429S, 431S, 433S).

Referring back to FIG. 1, an account holder may access one or more digital coupons 109a. Digital coupon 109a may be offered on a website 109 hosted by financial institution 101. Digital coupon 109a may be offered by merchant 107. Digital coupon 109a may be offered by an advertiser, or other third party. Website 109 may be provided by merchant 107, or a third party. As used herein, the term "coupon" refers to an offer for one or more discounts, incentives, and/or deals to a consumer for the purchase of goods or services. Coupons 109a and 109b may offer a discount on the purchase of one or more goods or services offered by merchant 107.

Coupons 109a and 109b may include coupon data. The coupon data may identify the product or products being offered at a discounted price. The coupon data may identify the number of products that the coupon may be applied to. The coupon data may include an expiration date and/or time for the coupon. The coupon data may include the value of the discount (for example, as a monetary value, as a percentage of the purchase price, and/or as a function of the number of items purchased). The coupon data may identify the manufacturer of the product or products being offered for discount. The coupon data may identify specific merchants where the coupon may be used, such as merchant 107.

Account holder 106 may view coupon 109a using device 106a. Website 109 may include on or more graphical user interfaces (GUIs) that allow account holder 106 to link the coupon 109a to one of account holder 106's accounts at financial institution 101. Website 109 may include one or more Application Programming Interfaces (APIs) that interact with software applications on device 106a and/or coupon processor 103. In various embodiments, website 109 may be integrated into a mobile application installed on mobile device 106a.

For example, in an embodiment, account holder 106 may access a website that provides online coupons for 25% on all purchases at Macy's over $100. Account holder 106 may view the digital coupon on the website and/or in a mobile application associated with the merchant and/or the financial institution using device 106a. The website and/or mobile application may display the coupon next to one or more buttons or icons on the screen that a user can click or otherwise activate, such as a button that says "clip to card." If account holder 106 clicks on this button (or touches it using a touch screen on device 106a), digital coupon 109a may be linked to account holder 106's account through, for example, various APIs associated with the merchant, mobile application(s) and/or financial institution.

In an example embodiment, to link a coupon 109a to account holder 106's account, website and/or mobile application 109 may send the coupon data for digital coupon 109a to coupon processor 103 at, for example, financial institution 101. Website and/or mobile application 109 may send the coupon data to device 106a, which can then send the coupon data to coupon processor 103 at, for example, financial institution 101. Before sending the coupon data to coupon processor 103, website and/or mobile application 109 may request authorization data from account holder 106. Authorization data may include a user name, a password, an account number associated with an account at financial institution 101, or other information that identifies account holder 106 to financial institution 101. Account holder 106 may provide authorization data to website and/or mobile application 109. Website and/or mobile application 109 may communicate with account holder 106 and/or financial institution 101 using one or more secure channels via network 108. Website and/or mobile application 109 may then send the coupon data with the authorization data to coupon processor 103 at financial institution 101.

In the case where website and/or mobile application 109 sends the coupon data to device 106a, account holder 106 may then send the coupon data to financial institution 101 along with authorization data. Device 106a may have one or more software applications that allow account holder 106 to electronically access his accounts at financial institution 101 and send the coupon data and authorization data to coupon processor 103.

Also, account holder 106 may receive coupon data from physical coupon 109b. Physical coupon 109b may be a paper coupon provided by merchant 107, financial institution 101, or a third party. Account holder 106 may receive the coupon 109b in the mail as part of a marketing campaign. Account holder 106 may see the coupon 109b in a magazine or newspaper. Account holder 106 may use device 106a to scan a bar code or QR code on coupon 109b. Device 106a may be a device equipped with one or more cameras and/or RFID readers. The bar code or QR code on physical coupon 109b may include the coupon data. Device 106a may read the coupon data from the bar code or QR code and store it on the device, using one or more software applications on device 106a.

Coupon processor 103 may receive the authorization data and the coupon data. Coupon processor 103 may compare the authorization data to account information from account processor 102. Account processor 102 may have access to every account at financial institution 101. Each account may include account information. The account information may include account numbers, the account holder's usernames, passwords, the account holder's phone numbers, the account holder's email addresses, physical addresses, and other information associated with each account at financial institution 101. If the received authorization data matches the account information for an account, coupon processor 103 will link the coupon data with that account. This may involve storing the coupon data in coupon database 104 with information that indicates the coupon data is linked to a specific account (or accounts). This may involve storing the coupon data with the account information for that account.

Account holder 106 may make one or more purchases at merchant 107. Merchant 107 may be a physical point of sale location. Merchant 107 may be an online retailer. Account holder 106 may purchase one or more products or services associated with coupon 109a or 109b. Merchant 107 may have previously issued coupons 109a or 109b. Account holder 106 may pay for the products or services using a payment method that is linked to one or more accounts at financial institution 101.

Merchant 107 may charge account holder 106's account for the purchases. Merchant 107 may provide financial institution 101 with transaction information associated with the purchase. Transaction information may include the account number that account holder 106 used to pay for the goods or services (such as a credit card number). Transaction information may include a merchant identifier, SKU-level (stock keeping unit) data for the item or items purchased, the location of the purchase, the date and time of the purchase, the purchase amount, whether any coupons or discounts were applied to the purchase, and other information.

Account processor 102 may receive the transaction information from merchant 107, or from a third party. Account processor 102 may use the transaction information to access the correct account for account holder 106. Account processor 102 may check the account to determine whether the account has been linked to any coupon data. Account processor 102 may check coupon database 104. If the account holder's account has been linked to coupon data, account processor 102 may compare the coupon data with the transaction information to determine whether the discount from the coupon data should be applied to the account that is being charged for the transaction. For example, the account processor 102 may compare the merchant information from the coupon data with the merchant identifier from the transaction information to determine whether they are associated with the same merchant. If at least some of the coupon data matches the transaction information, the account processor 102 may automatically apply the discount from the coupon data to the account. Account processor 102 may credit the account for the appropriate amount. Account processor 102 may reduce the amount charged to the account (from the transaction information) based on the discount from the coupon data.

For example, assume account holder 106 sees an offer for 25% off a Macy's purchase of $100, good for the next 10 days. The offer may be presented on one or more websites or within one or more mobile applications. The offer may be displayed next to one or more buttons that the account holder can click or press (using the touchscreen on his iPhone, for example) in order to "link" or "clip" the offer to one of his accounts. Once account holder 106 selects the offer, he may be directed to a page where he must input his authorization information. Account holder may input a username and/or password associated with his account at financial institution 101. Account holder 106 may input an account number for that account (such as a credit card number). Account holder 106 may input biometric information, or other data that uniquely identifies him as the holder of the account.

Once account holder 106 inputs the authorization data, the authorization data and coupon data may be transmitted to financial institution 101 (either from the website and/or mobile application hosting the offer, or from the account holders iPhone). The coupon data may include the name of the merchant offering the discount (Macy's), the amount (25% off the purchase price), a minimum purchase amount ($100), expiration information (10 days), and other information. Other information may include region-specific limitations (such as a geographic region where the offer can be redeemed).

Financial institution 101 may receive the authorization data and the coupon data. Coupon processor 103 may link the coupon data to account holder's financial account (e.g., credit card account) based on the authorization data. Coupon processor 103 may store the coupon data in a database (such as coupon database 104) and thereby link it to the account holder's account. If the authorization data is invalid or does not match any accounts, financial institution 101 may transmit one or more notifications to account holder 106 informing him that the offer cannot be linked. Financial institution 101 may also check one or more databases (not shown) to verify that the coupon data is valid. Merchant 107, advertisers, or other third parties may have previously provided financial institution 101 with coupon data that is eligible for customer redemption. Coupon processor 103 may compare the received coupon data with previously stored coupon data to determine whether the received coupon data is valid.

Account holder 106 may then purchase $200 of merchandise at a Macy's store and pay for it with a credit card that is associated with the account at financial institution 101. The merchant (or a third party) may submit the transaction information to financial institution 101 for settlement. The transaction information may include the purchase amount ($200), the credit card number, the account holder's name, the store name, a unique merchant identifier, the location of the store, the date and time of the transaction, the items purchased, any coupons or discounts that were applied, and other information.

Financial institution 101 may receive the transaction information and provide it to account processor 102 to charge the correct account for account holder 106. Account processor 102 may retrieve the coupon data that was previously linked to account holder 106's credit card account. The account processor may compare the coupon data to the transaction information. In this example, the account processor 102 may match the merchant name from the coupon data (Macy's) with the merchant name or identifier from the transaction information (Macy's). The account processor 102 may check that the conditions in the coupon data have been met (minimum purchase of $100). Account processor 102 may determine whether the account holder 106 already used the coupon when he purchased the goods at Macy's.

Account processor 102 may check the expiration date from the coupon data against the transaction date and time to ensure that the coupon is still valid. Based on the results of the comparisons between the transaction information and the coupon data, account processor 102 may apply the discount to the credit card account. In this example, the account holder's account would only be charged $150 for the purchase at Macy's, instead of the full $200. Accordingly, financial institution 101 may provide a 25 percent credit to the account holder's statement Account processor 102 may produce one or more statements reflecting the fact that the account holder has received the discount. The statements may also display other discounts or coupons that have been linked to that account, with an indication of whether the coupon has been redeemed or not.

Account processor 102 may delete the coupon data once it has been redeemed. Account processor 102 may remove the linked coupon data from database 102. Account processor may edit the account information to remove the coupon data so that it is no longer linked to the account and cannot be used again.

Figure 5:
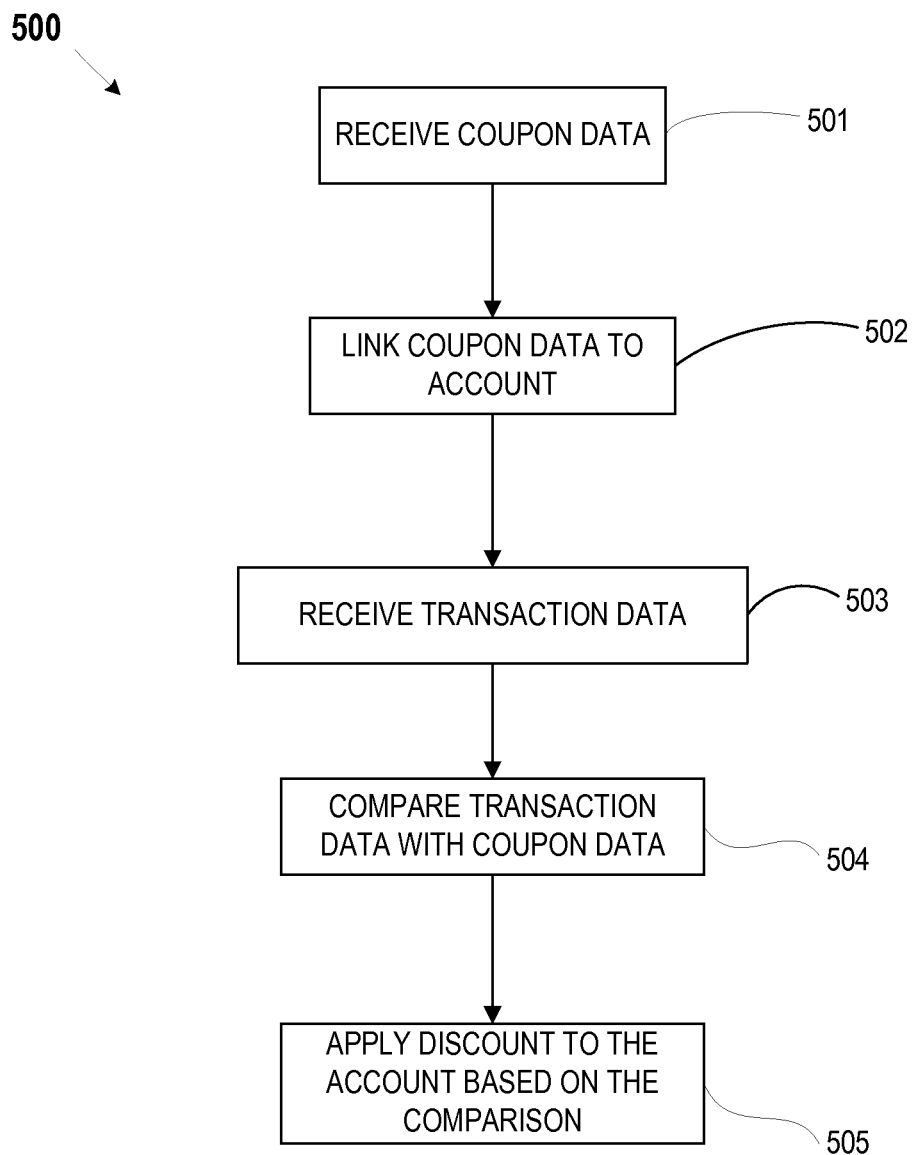
FIG. 5 depicts a flow diagram of a method for linking coupons with a financial account, according to an exemplary embodiment of the disclosure.

FIG. 5 is a flow chart illustrating a method 500 for linking coupon offers with an account holder's financial account. The method 500 shown in FIG. 5 can be executed or otherwise performed by one or more combinations of various systems. The method 500 as described below may be carried out by the system for linking coupon offers with an account holder's financial account as shown in FIGS. 1-4, by way of example, and various elements of that system are referenced in explaining the method of FIG. 5. Each block shown in FIG. 5 represents one or more processes, methods, or subroutines in the exemplary method 500. Referring to FIG. 5 the exemplary method 500 may begin at block 501.

In block 201, coupon data may be received. The coupon data may be received from device 106a, website 109, or some other party. For example, account holder 106 may see a paper coupon in a newspaper for $15 off any shoe purchase of $50 or more at Target. The offer may be limited to Target stores located in Virginia. The offer may expire on Aug. 1, 2013. The coupon may include a QR code that includes the coupon data. The coupon data may identify the amount of the discount ($15 off), any conditions associated with the discount (minimum purchase of $50), the merchandise the coupon may be applied to (shoes), the merchant (Target), an expiration date (Aug. 1, 2013), and other limitations (store must be located in Virginia).

Account holder 106 may use a mobile device (e.g., device 106a or device 202) to scan the QR code and upload the coupon data on the device. Account holder 106 may then the device to transmit the coupon data to a financial institution over a network. The device may have one or more software applications and/or APIs that can interface with one or more of account holder accounts at the financial institution. The account holder may use a software application on the device (e.g., a mobile banking application and the like) to transmit the coupon data, along with authorization data. The authorization data may be an account number, a user name, a password, biometric information, or other information that uniquely identifies the account holder and his account at the financial institution. A coupon processor may receive the coupon data and the authorization data. Method 500 may proceed to block 502.

At block 502, the received coupon data may be linked to one of the account holder's accounts. The coupon processor may check the authorization data to make sure it is valid and associated with an account. The coupon processor may use the authorization data to identify the correct account. The coupon processor may store the coupon data in a database with a link to the account holder's account. The coupon processor may add information to the account indicating that it is linked to coupon data. Method 500 may proceed to block 503.

In block 503, transaction data may be received. The transaction data may be received from a merchant where the account holder has made a purchase. Continuing with the previous example, account holder 106 may buy a $75 pair of running shoes at a Target in Arlington, Va. on Jul. 23, 2013. He may pay for the shoes with a credit card from financial institution 101. The merchant or a third party may send the transaction information to financial institution 101. Transaction information may include the purchase amount ($75), the date (Jul. 23, 2013), the location (Arlington, Va.), the item purchased (shoes), the time, a merchant name or merchant identifier (Target), the credit card number or account number used by account holder 106, the account holder's name, and other information that uniquely identifies the transaction. An account processor may receive the transaction data. Method 500 may proceed to block 504.

At block 504, the transaction data may be compared with the coupon data. An account processor may access the credit card account and retrieve the coupon data that is linked to the credit card account (assuming any coupon data has been linked to the account). If several offers or coupons have been linked to the credit card account, then the account processor may retrieve each set of coupon data and compare each set to the transaction data. Continuing with the previous example, the account holder's credit account may be linked to the coupon data associated with the offer from Target. The account processor may retrieve the coupon data from a coupon database, for example. The account processor may compare this coupon data with the transaction data. The account processor may determine that the merchant name from the coupon data (Target) matches the merchant name or identifier from the transaction data (Target). The account processor may compare the item purchased (shoes). If the merchant names do not match, or the items purchased do not match the items for the coupon data, the account processor may end the process, and/or begin comparing another set of coupon data with the transaction data. The account processor may compare the date of the transaction (July 23) with the expiration date of the coupon data (August 1). Account processor 102 may compare the transaction amount ($75) with the minimum purchase amount from the coupon data ($50). The account processor may compare the transaction location (Arlington, Va.) with the geographic restriction from the coupon data (transaction must be at a store in Virginia). Method 500 may proceed to block 505.

At block 505, method 500 may apply the discount to the account based on the results of the comparison from step 504. Continuing with the previous example, the account processor may determine that there is a close enough match between the transaction data and the coupon data. The account processor may reduce the transaction amount by the discount ($75−$15=$60). The account processor may charge the credit card account for the discounted amount ($60) instead of the purchase amount ($75).

If an insufficient match exists, or if the coupon data indicates that the coupon has expired, then the account processor may charge the credit account for the full purchase amount ($75).

The account processor may delete the coupon data once the discount has been applied so that the coupon data is no longer linked to the credit card account (thus preventing the coupon from being used more than once). In other embodiments, the coupon data may include a transaction limit that may allow the coupon to be used a specified number of times by the account holder. In this case, each time the account processor applies the discount to the linked account, the account processor may reduce the transaction limit of the coupon data by 1. Once the transaction limit has reached zero, the account processor may delete the coupon data.

The account processor and/or coupon processor may retain tracking information showing which coupons were redeemed by which account holders. The tracking information may show the merchant location where the account holder made the purchase that was ultimately discounted based on the coupon. The tracking information may include the SKU-level data from the transaction information showing which items or pieces of merchandise were purchased using the linked coupons. Tracking information may be kept anonymous, such as by means of a key or tokenization scheme. This information may be provided to merchants, manufacturers, advertisers, and other entities in order to show which discounts, coupons, or other offers were most successful, and to measure the effectiveness of product offers.

It is further noted that the software described herein maybe tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A system comprising:
    a front end controlled domain comprising a load balancer configured to monitor access to various services of a financial institution, and distribute workload by forwarding requests to a backend system and transmitting replies to a mobile device using a plurality of scheduling algorithms;
    the backend system including one or more components accessible to each other via one or more networks, the one or more components including:
        a financial institution database that stores an account of an account holder, the account includes information of a payment card of the account holder;
        a communication interface of the financial institution that receives, from a mobile device of the account holder via a network and as distributed by the load balancer, sets of coupon data associated with one or more discounts, wherein a set of the coupon data, from the sets of the coupon data, includes a merchant name and a transaction limit on a number of times a coupon is permitted to be used by the account holder;
        a linking processor that associates the sets of coupon data with the account of the account holder based on authorization data received from the mobile device of the account holder, the authorization data comprising data that identifies the account holder;
        a coupon processor that determines a match between the authorization data and account information of the account;
        an authorization network interface that receives, from merchants, transaction data relating to transactions associated with the account of the account holder, the transaction data comprising merchant identifiers for the transactions;
        a comparison processor of the financial institution that:
            identifies the account of the account holder from the transaction data received from the merchants;
            accesses the account of the account holder, checks the account of the account holder to determine whether the account has been linked to any coupon data, and
when the account has been linked to at least a first set of the sets of the coupon data, compares the first set of the sets of the coupon data with the transaction data to determine whether the merchant name associated with the first set of the sets of the coupon data matches a merchant identifier of the transaction data; and
a discount processor of the financial institution that generates a reduced transaction amount by reducing a transaction amount based on a discount associated with the first set of the sets of the coupon data after the comparison processor determines that the merchant name associated with the first set of the sets of the coupon data matches the merchant identifier of the transaction data, and charges the payment card of the account holder by the reduced transaction amount.

2. The system of claim 1, wherein the coupon data includes a threshold value and the comparison processor determines whether a qualifying transaction has occurred based on the threshold value.

3. The system of claim 2, wherein the threshold value is a minimum purchase amount, the transaction data includes a transaction amount for one of the transactions, and the comparison processor determines that a qualifying transaction has occurred when the transaction amount is greater than or equal to the minimum purchase amount.

4. The system of claim 1, wherein the mobile device captures the coupon data by scanning a bar code on a paper coupon.

5. The system of claim 1, further comprising a statement processor that generates an account statement that includes a credit.

6. The system of claim 1, wherein the coupon data includes information derived from optical character recognition on the mobile device.

7. The system of claim 1, wherein the coupon data includes an image of a coupon captured by the mobile device, and wherein the system further comprises an optical character recognition module that recognizes coupon data from the image of the coupon.

8. The system of claim 1, wherein:
the account is a financial account;
the linking processor and the coupon processor are associated with the financial institution; and
checking, by the comparison processor, the account to determine whether the account has been linked to any coupon data further comprises:
determining whether the transaction limit associated with the first set of the sets of the coupon data has been met;
when the transaction limit has been met, deleting the first set of the sets of the coupon data from the financial account and determining that the account has not been linked to the first set of the sets of the coupon data to prevent the transaction amount from being reduced by the one or more discounts associated with the first set of the sets of the coupon data; and
when the transaction limit has not been met, determining that the account has been linked to the first set of the sets of the coupon data and reducing the transaction limit by one increment.

9. The system of claim 1, wherein:
the account is a financial account;
the linking processor and the coupon processor are associated with the financial institution; and
the linking processor is further configured to compare the sets of coupon data received from the mobile device of the account holder with previously stored coupon data to verify that each of the sets of coupon data is valid before associating a respective set of coupon data with the financial account.

10. The system of claim 1, wherein the load balancer of the front end controlled domain is further configured to prevent the mobile device from contacting the backend system directly.

11. The system of claim 1, wherein the linking processor associates the coupon data with the account of the account holder by storing the sets of coupon data in the financial institution database with a link to the account of the account holder.

12. The system of claim 11, wherein the linking processor associates the coupon data with the account of the account holder by adding information to the account of the account holder indicating that the account of the account holder is linked to the coupon data.

13. A mobile device comprising:
an input mechanism of the mobile device that receives coupon data associated with one or more discounts;
a mobile application module of the mobile device that cooperates with the input mechanism to receive the coupon data; and
a communication interface of the mobile device that transmits, via a network, sets of the coupon data associated with one or more discounts from the mobile device to a financial institution system associated with an account of an account holder associated with the mobile device, wherein the account includes information of a payment card of the account holder, wherein a set of the coupon data includes a merchant name, and a transaction limit on a number of times a coupon is permitted to be used by the account holder, wherein the number of times the coupon is permitted to be used by the account holder is at least two, and wherein the financial institution system includes:
a front end controlled domain comprising a load balancer configured to monitor access to various services of the financial institution system, and distribute workload by forwarding requests to a backend system and transmitting replies to the mobile device using a plurality of scheduling algorithms; and
one or more databases including a financial institution database that stores the account of the account holder;
the backend system comprising one or more components accessible to each other via one or more networks, the one or more components including:
a communication interface of the financial institution system that receives, via a network and as distributed by the load balancer, the sets of the coupon data associated with one or more discounts from the mobile device;
a linking processor that associates the sets of the coupon data with the account of the account holder based on authorization data received from the mobile device, the authorization data comprising data that identifies the account holder;
a coupon processor that determines a match between the authorization data and account information of the account;

an authorization network interface that receives, from merchants, transaction data relating to transactions associated with the account of the account holder, the transaction data comprising merchant identifiers for the transactions;
a comparison processor of the financial institution system that
identifies the account of the account holder from the transaction data received from the merchants;
accesses the account of the account holder,
checks the account of the account holder to determine whether the account has been linked to any coupon data, and
when the account has been linked to at least a first set of the sets of the coupon data, compares the first set of the sets of the coupon data with the transaction data to determine whether the merchant name associated with the first set of the sets of the coupon data matches a merchant identifier of the transaction data; and
a discount processor of the financial institution system that generates a reduced transaction amount by reducing a transaction amount based on a discount associated with the first set of the sets of the coupon data after the comparison processor determines that the merchant name associated with the first set of the sets of the coupon data matches the merchant identifier of the transaction data, and charges the payment card of the account holder by the reduced transaction amount.

14. The mobile device of claim 13, wherein the mobile device further includes a mobile banking module.

15. The mobile device of claim 13, wherein the mobile application module is a mobile banking module.

16. The mobile device of claim 15, wherein the coupon data includes a threshold value and the comparison processor determines whether a qualifying transaction has occurred based on the threshold value.

17. The mobile device of claim 16, wherein the threshold value is a minimum purchase amount, the transaction data includes a transaction amount for one of the transactions, and the comparison processor determines that a qualifying transaction has occurred when the transaction amount is greater than or equal to the minimum purchase amount.

18. The mobile device of claim 15, wherein the mobile device captures the coupon data by scanning a bar code on a paper coupon.

19. The mobile device of claim 15, further comprising a statement processor that generates an account statement that includes a credit.

20. The mobile device of claim 15, wherein the coupon data includes information derived from optical character recognition on the mobile device.

21. The mobile device of claim 15, wherein the coupon data includes an image of a coupon captured by the mobile device, and wherein the financial institution system further comprises an optical character recognition module that recognizes coupon data from the image of the coupon.

22. The mobile device of claim 13, wherein:
the account is a financial account;
the linking processor and the coupon processor are associated with the financial institution system; and
checking, by the comparison processor, the account to determine whether the account has been linked to any coupon data further comprises:
determining whether the transaction limit associated the first set of the sets of the coupon data has been met;
when the transaction limit has been met, deleting the first set of the sets of the coupon data from the financial account and determining that the account has not been linked to the first set of the sets of the coupon data to prevent the transaction amount from being reduced by the one or more discounts associated with the first set of the sets of the coupon data; and
when the transaction limit has not been met, determining that the account has been linked to the first set of the sets of the coupon data and reducing the transaction limit by one increment.

23. The mobile device of claim 13, wherein:
the account is a financial account;
the linking processor and the coupon processor are associated with the financial institution system; and
the linking processor is further configured to compare the sets of the coupon data received from the mobile device of the account holder with previously stored coupon data to verify that each of the sets of the coupon data is valid before associating a respective set of coupon data with the financial account.

24. The mobile device of claim 13, wherein the load balancer of the front end controlled domain is further configured to prevent the mobile device from contacting the backend system directly.

25. A system for automatically applying coupons linked to a financial account to associated transactions comprising:
a financial institution database of a financial institution that is configured to store a first financial account of an account holder, the first financial account being associated with a first payment card of the account holder;
an application programming interface of the financial institution that is configured to receive input from the account holder via a mobile application implemented on a mobile device of the account holder to enable the account holder to directly link coupon data associated with at least a first coupon to the first financial account, wherein the coupon data associated with the first coupon comprises a corresponding merchant name, a corresponding discount, and a first transaction limit on a number of times that the first coupon is permitted to be used by the account holder; and
an account processor of the financial institution that is configured to:
receive, from a merchant system, first transaction data relating to a first transaction associated with the first financial account, the first transaction data comprising a merchant identifier and a transaction amount;
identify the first financial account from the first transaction data;
access the first financial account;
determine whether the account holder previously linked any coupon data to the first financial account by:
identifying the coupon data associated with the first coupon;
determining whether the first transaction limit associated with the coupon data associated with the first coupon has been met;
when the first transaction limit has been met, deleting the coupon data associated with the first coupon from the identified first financial account; and
when the first transaction limit has not been met, determining that the first financial account has been linked to the coupon data associated with the first coupon and reducing the first transaction limit by one increment;

responsive to determining that the first financial account has been previously linked to the coupon data associated with the first coupon, compare the coupon data associated with the first coupon with the first transaction data to determine whether the corresponding merchant name is associated with the merchant identifier of the first transaction data;

responsive to determining that the corresponding merchant name is associated with the merchant identifier of the first transaction data, automatically reduce the transaction amount based on the corresponding discount by generating a reduced transaction amount and charge the first payment card by the reduced transaction amount to complete the first transaction; and responsive to determining that either (i) the first financial account has not been previously linked to any coupon data or (ii) the corresponding merchant name is not associated with the merchant identifier of the first transaction data, charge the first payment card by the transaction amount to complete the first transaction.

26. The system of claim 15, wherein the application programming interface is further configured to provide a button associated with an offer for display within the mobile application, and the button being configured to selectively allow the account holder to directly link the offer to the first financial account.

27. The system of claim 15, wherein:
the coupon data directly linked to the first financial account is further associated with at least a second coupon, the coupon data associated with the second coupon comprising a corresponding merchant name, a corresponding discount, and a second transaction limit on the number of times that the second coupon is permitted to be used by the account holder;

determining whether the account holder previously linked any coupon data to the first financial account further comprises:
  identifying the coupon data associated with the second coupon;
  determining whether the second transaction limit associated with the coupon data associated with the second coupon has been met;
  when the second transaction limit has been met, deleting the coupon data associated with the second coupon from the identified first financial account; and
  when the second transaction limit has not been met, determining that the first financial account has been linked to the coupon data associated with the second coupon and reducing the second transaction limit by one increment; and the account processor is further configured to: responsive to determining that the first financial account has been previously linked to the coupon data associated with the second coupon, compare the coupon data associated with the second coupon with the first transaction data to determine whether the corresponding merchant name is associated with the merchant identifier of the first transaction data.

28. The system of claim 15, wherein the account processor is further configured to:
receive, from the mobile device of the account holder, geographic location information indicative of a merchant location where the first transaction was completed by charging the first payment card by the reduced transaction amount;
tokenize the geographic location information to form anonymous tracking information; and
provide the anonymous tracking information to at least the merchant system.

\* \* \* \* \*